C. GAUL.
TIRE.
APPLICATION FILED MAR. 18, 1913.
1,095,846.
Patented May 5, 1914.
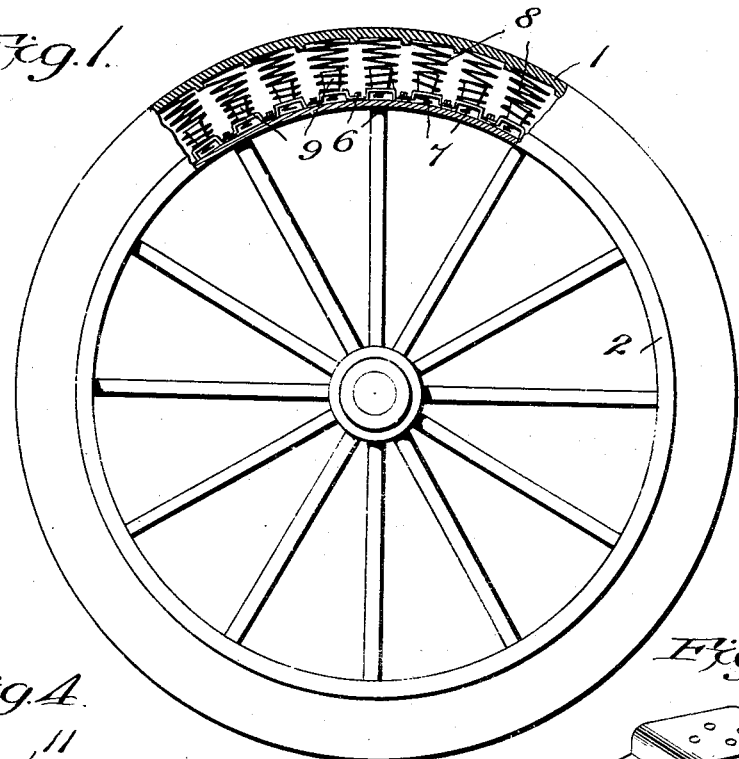
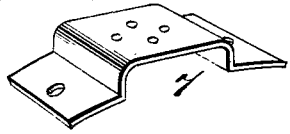
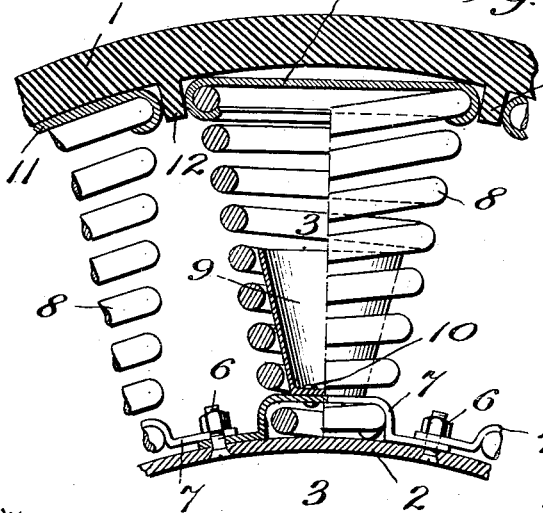
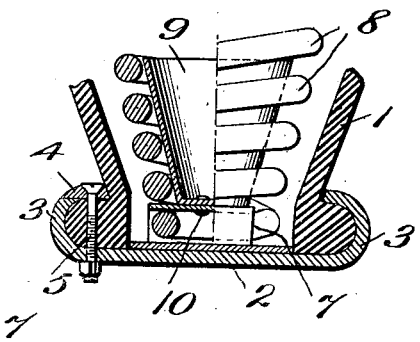
Inventor
Charles Gaul
By Victor J. Evans
Attorney
Witnesses

UNITED STATES PATENT OFFICE.

CHARLES GAUL, OF BROOKLYN HILLS, NEW YORK.

TIRE.

1,095,846. Specification of Letters Patent. Patented May 5, 1914.

Application filed March 18, 1913. Serial No. 755,218.

*To all whom it may concern:*

Be it known that I, CHARLES GAUL, a citizen of the United States, residing at Brooklyn Hills, in the county of Kings and State of New York, have invented new and useful Improvements in Tires, of which the following is a specification.

This invention relates to vehicle tires, and has for its general object to eliminate the expensive pneumatic tire now in use and to adapt a vehicle tire, whereby the desired resiliency may be obtained in a more efficient and economical manner. And to this end the invention resides in connecting to the rim of a vehicle wheel, a plurality of radially mounted helical springs and inclosing the same in a detachable shoe or casing.

Other objects will appear and be better understood from that embodiment of my invention of which the following is a specification, reference being had to the accompanying drawings forming a part hereof, in which:—

Figure 1 is a side elevational view partly in section and partly in side elevation of a vehicle wheel equipped with my improved tire. Fig. 2 is an enlarged detail sectional view of a portion of my improved tire. Fig. 3 is a cross sectional view taken on the line 3—3 of Fig. 2. Fig. 4 is a detail sectional view of one of the bearing plates or sheaths, and Fig. 5 is a detail perspective view of one of the spring retaining brackets.

My improved tire is designed to be used on an ordinary vehicle wheel and consists of a detachable shoe or casing 1 secured to the rim 2 by means of any suitable well-known form of clencher device. As illustrated in Fig. 3 of the drawings I have shown a clencher device comprising a rim provided with the usual inturned edges 3, one of which has a locking ring 4 secured thereto by means of a bolt 5, in order to engage the edges of the tire when secured in position.

Secured to the inner face of the rim 2 by means of bolts 6, is a plurality of inverted U-shaped brackets 7 for securing to the rim of the wheel, the inner ends of a plurality of radially disposed helical springs 8. The inner convolutions of these springs are passed around under the brackets 7 and are radially disposed thereon, and flaring cups 9 secured by the rivets 10 to the upper face of the brackets are provided for retaining the springs in their proper alined positions on the brackets and for also preventing their lateral movement when the tire is in use. The springs have their outer convolutions provided with sheaths or bearing plates 11 which are preferably formed of thin sheet metal and are sprung over the outer convolution of the spring as shown on the drawings and are provided for protecting that portion of the shoe or casing with which the springs contact.

By referring to Fig. 2 it will be noted that I have provided the shoe or casing with a series of inwardly projecting ribs 12 arranged in spaced relation on the inner face thereof and between which are fitted the brackets 7 for preventing the angular displacement of the springs at their outer ends when the tire is in use.

It is obvious that those skilled in the art may vary the details of construction and arrangements of parts without departing from the spirit of my invention and therefore I do not wish to be limited to such features except as may be required by the claim.

What is claimed as new is:—

In combination with a wheel rim, a casing secured thereto, brackets mounted upon the rim and having intermediate portions spaced from the rim, conical members mounted upon the intermediate portions of the brackets, and cone-shaped coiled springs interposed between the brackets and the casing, the smaller convolutions of the springs snugly receiving the conical members and the innermost convolutions of the springs engaging between the intermediate portions of the brackets and the rim.

In testimony whereof I affix my signature in presence of two witnesses.

CHARLES GAUL.

Witnesses:
M. E. LAUGHLIN,
GEO. A. BYRNE.